(12) United States Patent
Coleman et al.

(10) Patent No.: US 8,023,927 B1
(45) Date of Patent: Sep. 20, 2011

(54) ABUSE-RESISTANT METHOD OF REGISTERING USER ACCOUNTS WITH AN ONLINE SERVICE

(75) Inventors: Keith J. Coleman, Palo Alto, CA (US); Siwei Shen, San Jose, CA (US); Georges Harik, Palo Alto, CA (US); Kai Huang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1097 days.

(21) Appl. No.: 11/771,119

(22) Filed: Jun. 29, 2007

Related U.S. Application Data

(60) Provisional application No. 60/806,231, filed on Jun. 29, 2006.

(51) Int. Cl.
*H04M 1/66* (2006.01)
(52) U.S. Cl. ..... 455/410; 455/406; 455/411; 455/412.1; 455/435.1; 455/435.2; 713/168; 713/170; 713/171; 713/178
(58) Field of Classification Search ............ 455/410, 455/411, 435.1, 435.2, 435.3, 414.1, 412.1, 455/406; 713/155, 168, 170, 171, 178, 183, 713/184, 156, 179; 705/50, 70, 74–79, 1, 705/14, 18, 26
See application file for complete search history.

(56) References Cited

U.S. PATENT DOCUMENTS

| | | | |
|---|---|---|---|
| 5,541,977 A * | 7/1996 | Hodges et al. ............... 455/411 |
| 5,636,346 A | 6/1997 | Saxe ............................ 395/201 |
| 5,724,521 A | 3/1998 | Dedrick et al. ............... 395/226 |
| 5,845,265 A | 12/1998 | Woolston ....................... 705/37 |
| 5,918,010 A | 6/1999 | Appleman et al. ........ 395/200.33 |
| 5,920,854 A | 7/1999 | Kirsch et al. ...................... 707/3 |
| 5,931,901 A | 8/1999 | Wolfe et al. .................... 709/206 |
| 5,974,398 A | 10/1999 | Hanson et al. ................. 705/14 |
| 6,026,368 A | 2/2000 | Brown et al. .................. 705/14 |
| 6,044,375 A | 3/2000 | Shmueli et al. ............... 707/101 |
| 6,061,659 A | 5/2000 | Murray ........................... 705/14 |
| 6,067,570 A | 5/2000 | Kreynin et al. ............... 709/227 |
| 6,078,866 A | 6/2000 | Buck et al. ....................... 702/2 |
| 6,161,130 A | 12/2000 | Horvitz et al. ................ 709/206 |
| 6,195,698 B1 * | 2/2001 | Lillibridge et al. .......... 709/225 |

(Continued)

FOREIGN PATENT DOCUMENTS

EP 1026610 A2 8/2000

(Continued)

OTHER PUBLICATIONS

Finextra, "ASB Bank Authenticates Internet Users VIA SMS," retrieved from the internet on Dec. 22, 2005, URL:www.finextra.com/fullstory.asp?pf=y&d=9196, 1 pg.

(Continued)

*Primary Examiner* — Olumide T Ajibade Akonai
(74) *Attorney, Agent, or Firm* — Morgan, Lewis & Bockius LLP

(57) ABSTRACT

A computer implemented method for registering user accounts that includes sending a first request to an online service wherein the first request includes a telephone number, sending a second request to the online service wherein the second request includes an invitation code received via a telephone associated with the telephone number, and upon acceptance of the invitation code by the online service, receiving an invitation from the online service, to register a user account.

15 Claims, 9 Drawing Sheets

U.S. PATENT DOCUMENTS

| | | | |
|---|---|---|---|
| 6,199,102 B1 | 3/2001 | Cobb | 709/206 |
| 6,223,163 B1 | 4/2001 | Van Luchene | 705/1 |
| 6,230,170 B1 | 5/2001 | Zellweger et al. | 707/512 |
| 6,247,009 B1 | 6/2001 | Shiiyama et al. | 707/3 |
| 6,253,189 B1 | 6/2001 | Feezell et al. | 705/14 |
| 6,269,361 B1 | 7/2001 | Davis et al. | 703/3 |
| 6,285,987 B1 | 9/2001 | Roth et al. | 705/27 |
| 6,298,348 B1 | 10/2001 | Eldering | 707/10 |
| 6,324,519 B1 | 11/2001 | Eldering | 705/14 |
| 6,336,132 B2 | 1/2002 | Appleman et al. | 709/203 |
| 6,421,675 B1 | 7/2002 | Ryan et al. | 707/100 |
| 6,871,063 B1 | 3/2005 | Schiffer | 455/410 |
| 6,907,239 B1 * | 6/2005 | Sivula | 455/406 |
| 6,934,838 B1 * | 8/2005 | Boyce et al. | 713/156 |
| 7,139,740 B2 | 11/2006 | Ayala | 706/26 |
| 7,254,705 B2 * | 8/2007 | Yokota et al. | 713/155 |
| 7,606,918 B2 * | 10/2009 | Holzman et al. | 709/229 |
| 2001/0042064 A1 | 11/2001 | Davis et al. | 707/3 |
| 2001/0047297 A1 | 11/2001 | Wen | 705/14 |
| 2001/0051911 A1 | 12/2001 | Marks et al. | 705/37 |
| 2001/0053685 A1 * | 12/2001 | Mori et al. | 455/411 |
| 2002/0002509 A1 | 1/2002 | Wagorn et al. | 705/26 |
| 2002/0002525 A1 | 1/2002 | Arai et al. | 705/37 |
| 2002/0026359 A1 | 2/2002 | Long et al. | 705/14 |
| 2002/0035536 A1 | 3/2002 | Gellman | 705/37 |
| 2002/0038282 A1 | 3/2002 | Montgomery | 705/37 |
| 2002/0046099 A1 | 4/2002 | Frengut et al. | 705/14 |
| 2002/0046104 A1 | 4/2002 | Kaddeche et al. | 705/14 |
| 2002/0077891 A1 | 6/2002 | Castle et al. | 705/14 |
| 2002/0099605 A1 | 7/2002 | Weitzman et al. | 705/14 |
| 2002/0111898 A1 | 8/2002 | Numaoka et al. | 705/37 |
| 2002/0123988 A1 | 9/2002 | Dean et al. | 707/3 |
| 2002/0165773 A1 | 11/2002 | Natsuno et al. | 705/14 |
| 2002/0184097 A1 | 12/2002 | Hijiri et al. | 705/14 |
| 2002/0194062 A1 | 12/2002 | Linde | 705/14 |
| 2002/0198780 A1 | 12/2002 | Kawakami et al. | 705/14 |
| 2003/0037334 A1 | 2/2003 | Khoo et al. | 725/46 |
| 2003/0070167 A1 | 4/2003 | Holtz et al. | 725/32 |
| 2003/0083937 A1 | 5/2003 | Hasegawa et al. | 705/14 |
| 2003/0149618 A1 | 8/2003 | Sender et al. | 705/14 |
| 2003/0163372 A1 | 8/2003 | Kolsy | 705/14 |
| 2003/0172272 A1 * | 9/2003 | Ehlers et al. | 713/170 |
| 2003/0216963 A1 | 11/2003 | Ishiwaka et al. | 705/14 |
| 2004/0003084 A1 | 1/2004 | Malik et al. | 709/225 |
| 2004/0003283 A1 | 1/2004 | Goodman et al. | 713/201 |
| 2004/0015397 A1 | 1/2004 | Barry et al. | 705/14 |
| 2004/0019523 A1 | 1/2004 | Barry et al. | 705/14 |
| 2004/0044571 A1 | 3/2004 | Bronnimann et al. | 705/14 |
| 2004/0054577 A1 | 3/2004 | Inoue et al. | 705/14 |
| 2004/0054589 A1 | 3/2004 | Nicholas et al. | 705/14 |
| 2004/0059708 A1 | 3/2004 | Dean et al. | 707/1 |
| 2004/0059712 A1 | 3/2004 | Dean et al. | 707/1 |
| 2004/0093327 A1 | 5/2004 | Anderson et al. | 707/3 |
| 2004/0093620 A1 | 5/2004 | Iino et al. | 725/134 |
| 2004/0119740 A1 | 6/2004 | Chang et al. | 345/751 |
| 2004/0143499 A1 | 7/2004 | Dietsch et al. | 705/14 |
| 2004/0143843 A1 | 7/2004 | Khoo et al. | 725/34 |
| 2004/0167928 A1 | 8/2004 | Anderson et al. | 707/104.1 |
| 2004/0177110 A1 | 9/2004 | Rounthwaite et al. | 709/202 |
| 2004/0199597 A1 | 10/2004 | Libbey et al. | 709/207 |
| 2004/0249709 A1 | 12/2004 | Donovan et al. | 705/14 |
| 2005/0021649 A1 | 1/2005 | Goodman et al. | 709/207 |
| 2005/0044154 A1 | 2/2005 | Kaminski et al. | 709/206 |
| 2005/0044155 A1 | 2/2005 | Kaminski et al. | 709/206 |
| 2005/0065806 A1 | 3/2005 | Harik | 705/1 |
| 2005/0071224 A1 | 3/2005 | Fikes et al. | 705/14 |
| 2005/0096979 A1 | 5/2005 | Koningstein | 705/14 |
| 2005/0131758 A1 | 6/2005 | Desikan et al. | 705/14 |
| 2005/0131762 A1 | 6/2005 | Bharat et al. | 705/14 |
| 2005/0144069 A1 | 6/2005 | Wiseman et al. | 705/14 |
| 2005/0204005 A1 | 9/2005 | Purcell et al. | 709/206 |
| 2005/0216335 A1 | 9/2005 | Fikes et al. | 705/14 |
| 2005/0222900 A1 | 10/2005 | Fuloria et al. | 705/14 |
| 2005/0222903 A1 | 10/2005 | Buchheit et al. | 705/14 |
| 2005/0222989 A1 | 10/2005 | Haveliwala et al. | 707/3 |
| 2005/0223002 A1 | 10/2005 | Agarwal et al. | 707/7 |
| 2005/0229251 A1 | 10/2005 | Chellapilla et al. | 726/23 |
| 2005/0262210 A1 | 11/2005 | Yu | 709/206 |
| 2005/0287984 A1 * | 12/2005 | St.Clair | 455/406 |
| 2006/0107316 A1 * | 5/2006 | Fiske | 726/18 |
| 2006/0154661 A1 * | 7/2006 | Gonen et al. | 455/435.1 |
| 2006/0195604 A1 | 8/2006 | Goodman et al. | 709/232 |
| 2006/0286530 A1 | 12/2006 | Forrest et al. | 434/323 |

FOREIGN PATENT DOCUMENTS

| | | | |
|---|---|---|---|
| WO | WO 0038074 A1 | 6/2000 | |
| WO | WO 2004/042525 A2 | 5/2004 | |

OTHER PUBLICATIONS

Roberts, P., "AOL, RSA, VeriSign Push Authentication Services," IDG News Service, retrieved from the internet on Dec. 22, 2005, URL: http://www.networkworld.com/news/2004/0921aolrsa.html, Sep. 21, 2004, 4 pgs.

Roberts, P., "AOL, RSA, VeriSign Push Authentication Services," IDG News Service, retrieved from the internet on Dec. 22, 2005, URL: http://www.computerworld.com/news/2004/0921aolrsa.html, Sep. 21, 2004, 3 pgs.

Secure Computing, "Securing Connections between People, Applications and Networks," retrieved from the internet on Dec. 22, 2005, URL: http://www.securecomputing com, 1 pg.

Secure Computing, "The MobilePass Solution: Zero-Footprint Authentication Through Text Messaging," retrieved from the internet on Dec. 22, 2005, 4 pgs. http://www.securecomputing.com/index.cfm?skey=1155.

Sherman, C., "Google Launches AdWords Select," Feb. 20, 2002, 6 pages.

Visualtron, "MobileKey TM (Mobile Authentication Server)", retrieved from the internet on Sep. 19, 2008, publishing date Jun. 28, 2003, 3 pgs. http://web.archive.org.web/20030628084645 http://visualtron.com/products_mobilekey.html.

Von Ahn, L., et al., "Telling Humans and Computers Apart Automatically," Communications of the ACM, vol. 47, Feb. 2004, pp. 57-60.

Von Ahn, L. et al., "CAPTCHA: Using Hard AI Problems for Security," Lecture Notes in Computer Science, vol. 2656, Jan. 2003, 18 pgs.

* cited by examiner

| | | |
|---|---|---|
| First name: | John | 602 |
| Last name: | Smith | 604 |
| Desired Login name: | john.smith  @gmail.com | 606 |
| | Check availability | 608 |
| Choose a password: | ******* | 610 |
| Re-enter password: | ******* | 612 |
| Security Question: | What was your first phone number | 614 |
| Answer: | 650-555-1212 | 616 |
| Secondary email: | Jsmith@gmail.com | 618 |
| Location: | United States | 620 |

Terms of Service: Please check the Google Account information you've entered above (feel free to change anything you like), and review the Terms of Service below.

622

Google Terms of Service for your Personal Use

Welcome! By using Google's search engine or other Google services ("Google Services"), you agree to be bound by the By clicking on 'I accept' below you are agreeing to the Terms of Service above and both the Program Policy and the Privacy Policy.

I accept. Create my account. 624

Figure 6

ABUSE-RESISTANT METHOD OF REGISTERING USER ACCOUNTS WITH AN ONLINE SERVICE

RELATED APPLICATION

The application claims priority to U.S. Provisional Patent Application No. 60/806,231, filed Jun. 29, 2006, entitled "Abuse-Resistant Method of Registering User Accounts with an Online Service," which application is incorporated by reference herein in its entirety.

TECHNICAL FIELD

The disclosed embodiments relate generally to the creation of new user accounts for online services (e.g., Internet-based services, such as electronic mail (email)).

BACKGROUND

Users of the Internet may register for customized/personalized online user accounts for many different purposes. In particular, many users register for online email accounts through various providers. However, computer programs may be implemented to register for and create multiple new email accounts (e.g., with an online or web based email service) without an actual human user being involved. Such accounts are often used for sending unsolicited electronic communications known as spam.

SUMMARY

In accordance with some embodiments, a computer implemented method for registering user accounts, may include sending a first request to an online service wherein the first request includes a telephone number, sending a second request to the online service wherein the second request includes an invitation code received via a telephone associated with the telephone number, and upon acceptance of the invitation code by the online service, receiving an invitation from the online service to register a user account with an online service.

In accordance with some embodiments, a method for registering user accounts may include sending a first request to an online service wherein the first request may include a mobile telephone number, receiving an invitation code via a mobile telephone associated with the mobile telephone number, sending a second request to the online service wherein the second request includes the invitation code; and upon acceptance of the invitation code by the online service, registering a user account.

In accordance with some embodiments, a computer implemented method for registering user accounts may include receiving a request for an invitation code from a client wherein the request includes a telephone number, generating an invitation code, storing information corresponding to the invitation code and the received telephone number in association with each other, and sending the generated invitation code to the telephone number.

In accordance with some embodiments, a computer implemented method for registering user accounts with an online service may include presenting a challenge to a client and receiving a request for an invitation code from the client. The request may include a telephone number and a response to the presented challenge. Upon determining satisfactory completion of the presented challenge, the computer implemented method may further include generating an invitation code, storing information corresponding to the invitation code and the received telephone number in association with each other, and sending the generated invitation code to the telephone number.

In accordance with some embodiments, a system for registering user accounts with an online service may include memory, one or more processors, and one or more modules stored in memory and configured for execution by the one or more processors. The one or more modules include instructions for the following: receiving a request for an invitation code from a client wherein the request includes a mobile telephone number; generating an invitation code; storing information corresponding to the invitation code and the mobile telephone number in association with each other; and sending the generated invitation code to the mobile telephone number.

In accordance with some embodiments, a system for registering electronic mail accounts may include memory, one or more processors, and one or more modules stored in memory and configured for execution by the one or more processors. The one or more modules include instructions for the following: presenting a challenge to a client; receiving a request for an invitation code from a client wherein the request includes a mobile telephone number and a response to the presented challenge; determining satisfactory completion of the presented challenge; generating an invitation code; storing information corresponding to the invitation code and the mobile telephone number in association with each other; sending the generated invitation code to the mobile telephone number.

BRIEF DESCRIPTION OF THE DRAWINGS

FIG. 6 illustrates a schematic screenshot of a user account registration page according to an embodiment of the present invention.

DESCRIPTION OF EMBODIMENTS

Figure 1:
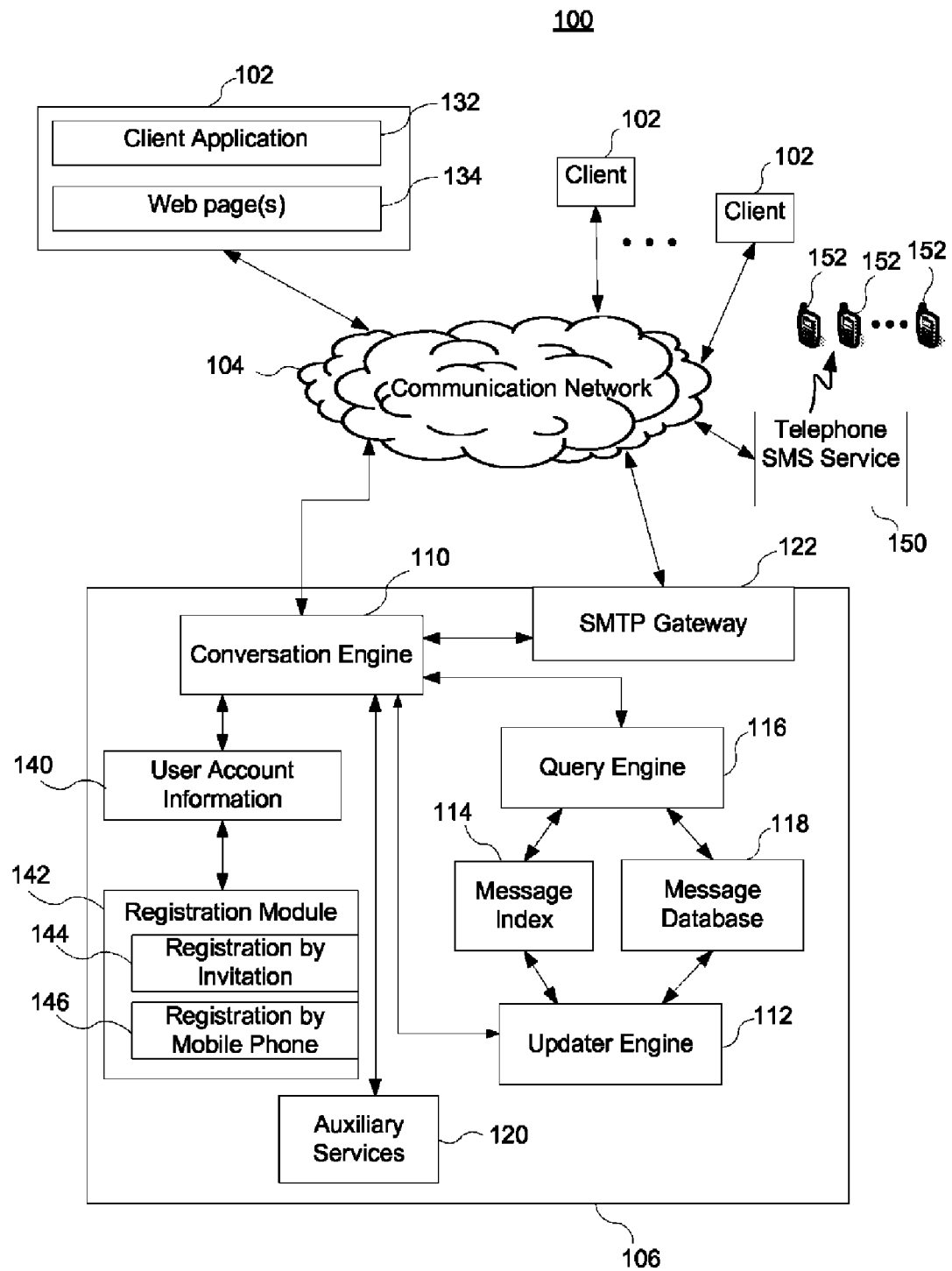
FIG. 1 is a block diagram of an exemplary environment for registering new user accounts (e.g., email accounts) for an online service in accordance with some embodiments of the present invention.

FIG. 1 is a block diagram of a system 100 for implementing some embodiments of the invention. One or more clients computers or devices 102 (hereinafter "clients") can be connected to a communication network 104. The communication network 104 can be connected to an information service 106. The information service 106 can include a conversation engine 110, an updater engine 112, a message index 114, a query engine 116, a message database 118, one or more auxiliary services servers 120, an SMTP gateway 122, user account information 140, and a registration module 142. The registration module 142 can include a registration by invitation module 144 and a registration by mobile telephone module 146. Module 146 will be discussed in more detail below. The communication network 104 can also be connected to a telephone SMS service 150, which can communicate with (e.g., send text messages to) one or more mobile telephones 152.

The client 102 can be any of a number of devices (e.g. a computer, an internet kiosk, a personal digital assistant, a cell phone, a desktop computer, or a laptop computer) and can include a client application 132 that permits a user to view web pages 134 or other documents or information. The client application 132 can be a software application that permits a user to interact with the client 102 and/or network resources to perform one or more tasks. For example, the client application can be a web browser (e.g., Firefox) or other type of application that permits a user to search for, browse, and/or use resources, such as one or more web pages 134, on the client 102 and/or accessible via the communication network 104.

The communication network 104 can be any local area network (LAN) and/or wide area network (WAN), such as an intranet, an extranet, or the Internet. It is sufficient that the communication network 104 provides communication capability between the clients 102 and the information services 106. In some embodiments, the communication network 104 uses HyperText Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any piece of information or service that is accessible via a Uniform Resource Locator (URL) and can be, for example, a web page, a text or word processing document, an email message, a transcribed voice message, a database, an image, or a computational object.

The conversation engine 110 can respond to a variety of request from the client application related to electronic messages and return conversation-based response via its connection with the communication network 104. A conversation may include one or more relevant messages relating to a conversation topic. In some embodiments, a conversation may include a message draft that has been composed by a user, but not delivered to its recipient(s) by the information service 106. In the context of the present application, "message" include both electronic messages received by a user and message drafts composed by the user. All messages directed to a user of the information service 106 can be grouped into a plurality of conversations and presented to the user in a conversation-based format, individually or jointly. In a conversation list view, a user can see in a summary form a list of conversations in which the user participates. In a conversation view, the user can see in an expanded form one or more of messages associated with a particular conversation.

The SMTP gateway 122 is also connected to the communication network 104. The SMTP gateway 122 can be directly involved in receiving and sending messages between the information service 106 and other email systems, messaging systems or information services. In some embodiments, the SMTP gateway 122, for example, transmits and receives messages using the simple mail transfer protocol (SMTP). The SMTP gateway 122 can receive a new message from the communication network 104 and send the message to conversation engine 110 for additional processing. Additionally, the SMTP gateway 122 can receive messages from the conversation engine 110 and then transmit (via the communication network 104) those messages to recipient addresses specified in the messages.

The one or more auxiliary services servers 120 can provide additional services to the conversation engine 110. The auxiliary services servers 120 can, for example, include a spam detection module for detecting and processing spam and/or an attachment management module for managing the storage and retrieval of documents attached to messages.

The registration module 142 may allow new users to register for new user accounts. The registration module 142 may include a registration by invitation module 144 and a registration by mobile telephone module 146. The registration by invitation module 144 may allow a new user to register for a new user account by receiving an invitation from an existing user (i.e., from a previously registered user). The registration by mobile telephone module 146 may allow a new user to register for a new user account by sending a request to the information service 106. If the request is approved, the registration by mobile telephone module 146 may send an invitation code to be used in order to register for a new user account. The invitation code may be sent through the communication network 104 to a telephone SMS service 150, which in turn sends a message (e.g., a text message) that includes the invitation code to the mobile telephone 152.

FIG. 1 is exemplary. In some embodiments, the information service 106 contains a subset or superset of those elements illustrated in the figure. Although FIG. 1 shows the information service 106 as a number of discrete elements, this figure is intended more as a functional description of the various features which may be present in the information service 106 than as a structural schematic of the various embodiments. In practice, and as recognized by those of ordinary skill in the art, some elements shown separately could be combined and some elements could be further divided into sub-elements or parallel elements. For example, some separate elements in the figure could be implemented by a single server or module and some single elements could be implemented by one or more servers or modules. The actual number of servers in information service 106 and how features are allocated among the servers will vary from one implementation to another, and may depend in part on the amount of traffic that the system must handle during peak usage periods as well as during average usage periods. For example, the message database 118 can be implemented using a plurality of servers if the information service 106 manages a large volume of messages associated with a large number of user accounts.

In some embodiments, the information service 106 is not an email service, and thus does not include a conversation engine 110, SMTP gateway 122, etc. Instead, the information service 106 includes servers for providing other online services, such as online calendar services, financial services, or retail or wholesale product sales.

As mentioned above, the client 102 can include client application 132 that permits a user to search one or more web pages 134. Client application 132 can provide a window to be displayed on a displaying device (e.g., a monitor) for rendering information sent by the information service 106 as well as information entered by a user of the client 102. In embodiments in which the information service 106 is, or includes, an email service, the client application 132 can provide a window to be displayed on a displaying device (e.g., a monitor) for rendering conversations and targeted information. The conversations, targeted information and messages in the conversations can be encoded using HyperText Markup Language (HTML), XML, or any other appropriate markup language or encoding scheme, and then rendered by the client application 132. When a user submits a request through client application 132 to the information service 106 to register for a new email account, the information service 106, via the registration module 142, allows a user to register a new user account in one of two ways. As mentioned above, the user may register a new user account via the registration by invitation module 144 or the registration by mobile telephone module 146. In another embodiment, client assistant 134 may alternatively exist and operate in the information service 106.

Figure 2A:
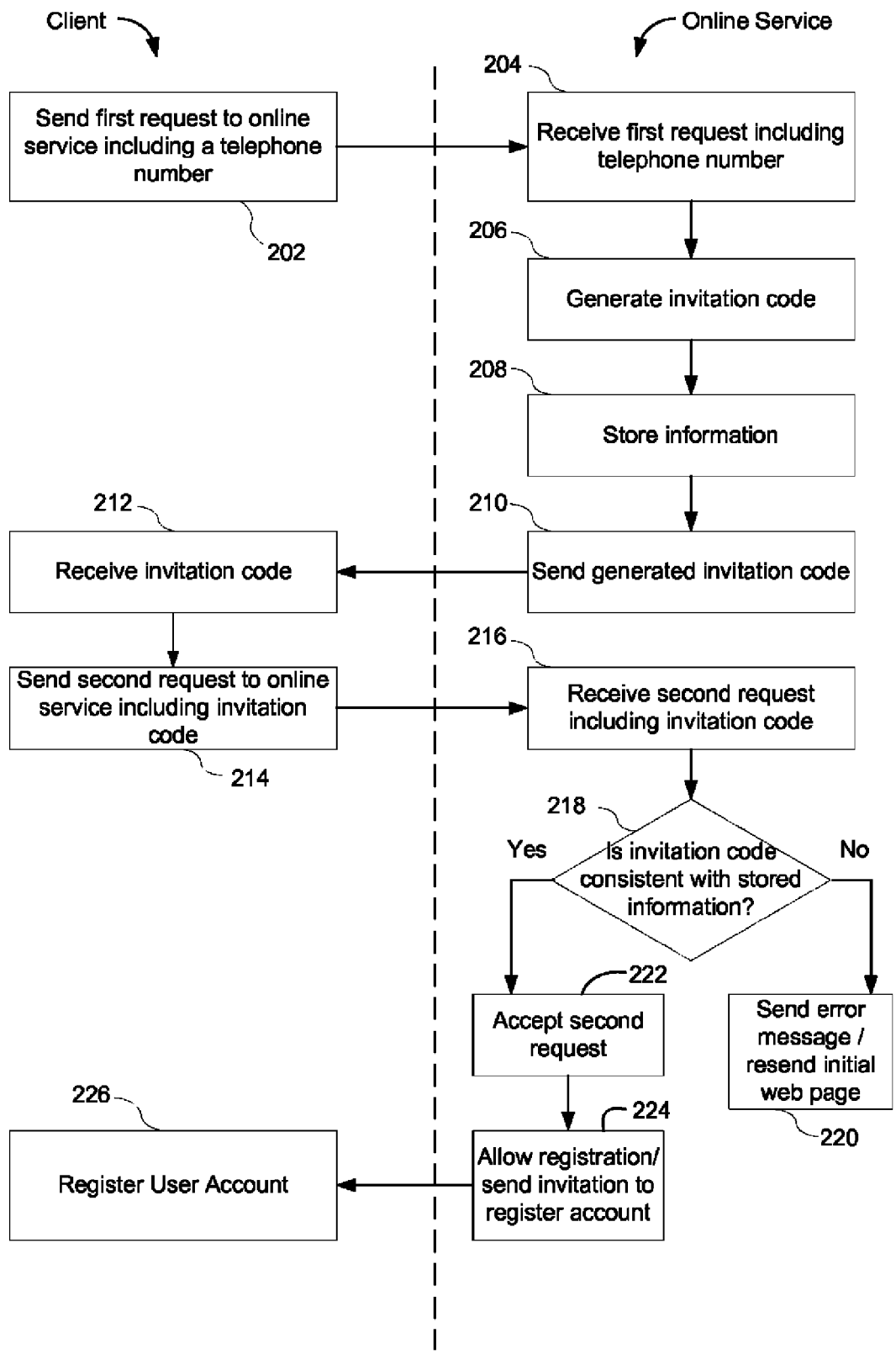
FIG. 2A is a flow diagram of a process for registering new user accounts according to an embodiment of the present invention.

FIG. 2A is a flow diagram of a process for registering a new user account (e.g., an email account, or other online service account) according to one embodiment of the present invention. According to this embodiment, a client sends a first request to an online service 202. In some embodiments, the request may include a telephone number. For example, the request may include a mobile telephone number. In some embodiments, the first request is submitted by entering information into an online form (e.g., a web page) and then submitting the entered information to an online service or other server. The information in the form may be submitted (e.g., when the user clicks on a "submit" button in the online form) using an HTTP form submission command, or any other suitable operation.

As used in this document, the phrase "HTTP form submission command" refers to a command to perform an HTTP Post, an HTTP Get, an HTTPS Post, or an HTTPS Get in order to submit user data to a server or online service. HTTP refers to Hyper Text Transfer Protocol, and HTTPS refers to Hyper Text Transfer Protocol Secure (a variant of HTTP for handling secure transactions using SSL, the Secure Sockets Layer protocol).

The online service receives the first request 206, including the telephone number or mobile telephone number, and generates an invitation code 206. The online service may store information 208, such as information related to the invitation code and mobile telephone number. The invitation code and mobile telephone number may be stored in association with one another. In some embodiments, a value associated with the invitation code and mobile telephone number is stored. The value may indicate than an account has not yet been registered using the invitation code in combination with the mobile telephone number. In other embodiments, a count value may be stored. The count value may correspond to the number of accounts registered using a particular telephone number or mobile telephone number. For example, an initial count value of zero may be stored in association with the telephone number if no accounts have been previously registered using this telephone number. After the information is stored 208, the online service may send the generated invitation code 210, which is then received by the client.

To continue the registration process, a client sends a second request to the online service, which includes the received invitation code 214. In some embodiments, the second request is also submitted to the online service through the use of an online form. The online service receives the second request 216. An inquiry is then performed 218 to determine whether the invitation code in the received second request is consistent with the stored information. If the information is not consistent with the stored information (218-No), in some embodiments, an error message may be sent 220. In other embodiments, if the information is not consistent with the stored information (218-No), the online service may resend the initial web page 220. However, if the information is consistent with the stored information (218-Yes), the second request may be accepted 222. The online service may then allow registration or send an invitation to register an account 224 to the client. The client may then register a user account 226.

Figure 2B:
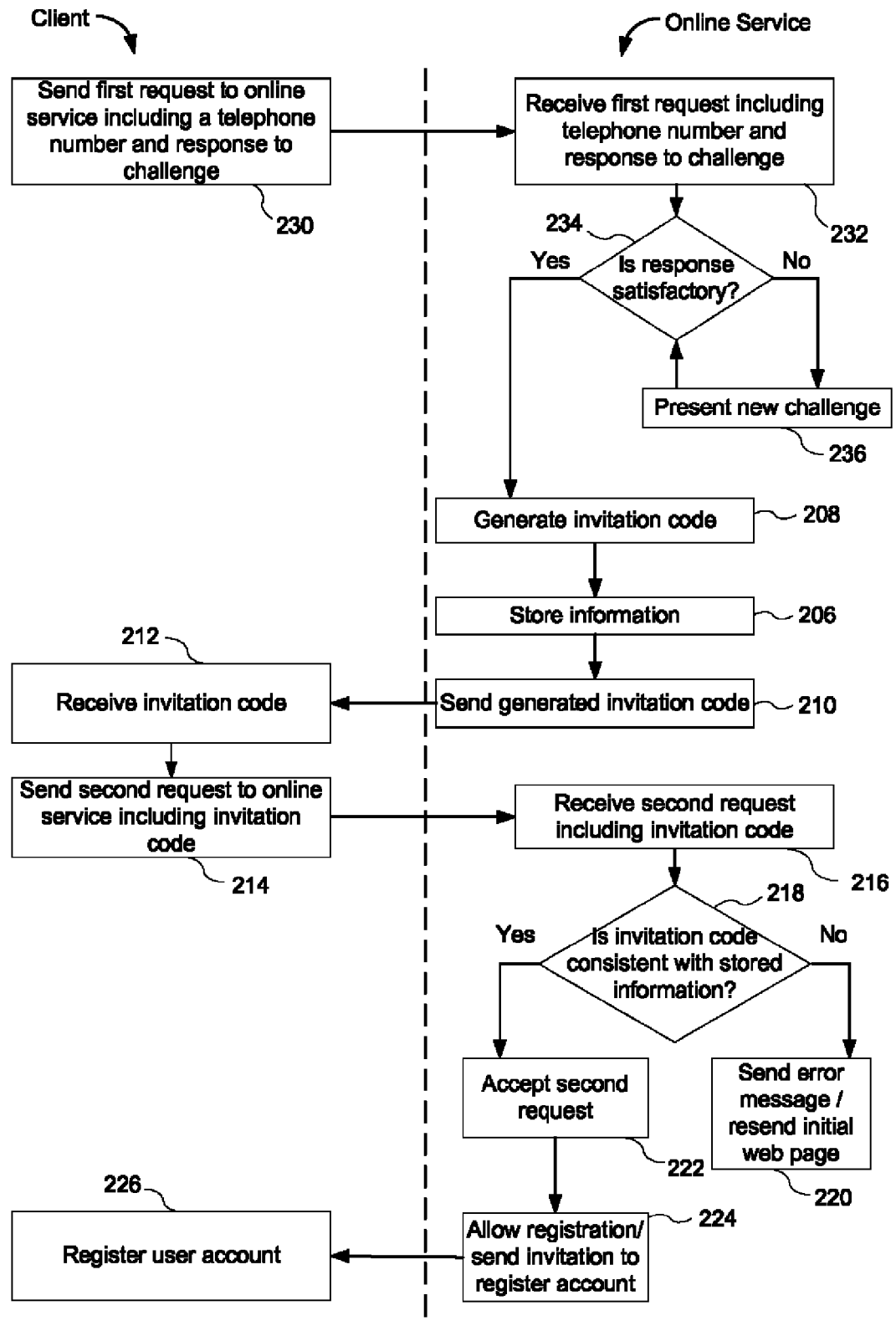
FIG. 2B is a flow diagram of a process for registering new user accounts according to another embodiment of the present invention.

FIG. 2B is a flow diagram of a process for registering a new user account according to another embodiment of the present invention. Similar to the embodiment shown in FIG. 2A, a client may send a first request to an online service 230. As in the embodiment shown in FIG. 2A, the first request may be submitted by entering information into an online form (e.g., a web page) and then submitting the entered information to an online service or other server. In some embodiments, the first request may include a telephone number, for example, a mobile telephone number. In this embodiment, the first request also includes a response to a challenge. In some embodiments, the challenge may include a challenge-response authentication technique that attempts to determine whether the creator is a human being or not. A well-known example of such a challenge is the "completely automated public Turing test to tell computers and humans apart" (CAPTCHA). The CAPTCHA technique involves the presentation of automatically administered and graded test that a human should be able to pass but that a software program such as a "bot" should not be able to pass. The CAPTCHA may be visual (requiring listening to speech, sound recognition, or some other form of aural perception). Examples of the "tests" used in CAPTCHAs include identification of visually distorted text or audibly distorted speech, and answering pattern recognition problems. Further information regarding the CAPTCHA technique is disclosed in U.S. Pat. No. 6,195,698, titled "Method for Selectively Restricting Access to Computer Systems;" and in Ahn et al., "Telling Humans and Computers Apart Automatically," *Communications of the ACM*, February 2004, pp. 57-60; the disclosures of which are hereby incorporated by reference in their entirety as background information.

The online service may receive the first request, including the telephone number or mobile telephone number and response to the challenge 232. The online service may make a determination as to whether the response is satisfactory 234. If the response is not satisfactory (234-No), the user has failed the challenge and a new challenge may be therefore presented 236. If the response is satisfactory (234-Yes), the online service may generate an invitation code (208). The subsequent steps of this flowchart follow those of FIG. 2A.

Figure 2C:
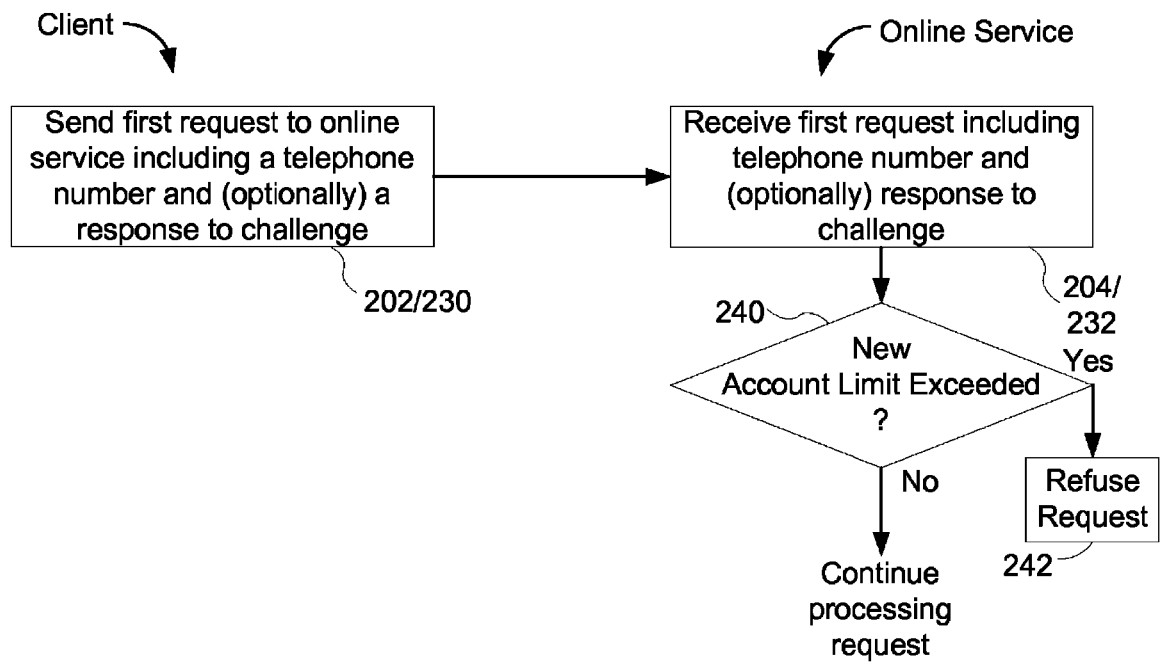
FIG. 2C is a flow chart of an alternate embodiment of an initial phase of the user account registration process.

FIG. 2C is a flow chart of an alternate embodiment of an initial phase of the user account registration process. In some embodiments, after the online service receives the first request (204, FIG. 2A or 232, FIG. 2B) which includes a telephone number and may also include a response to a challenge, the telephone number in the request is compared with the stored information to determine if the request violates a limit imposed on new account registrations 240. For example, the online service may impose a limit of one new account registration during a predefined time period (e.g., a day or week) for each unique telephone number. Alternately, the online service may impose a limit of N (e.g., 2, 3, 4 or 5) new accounts registration during a predefined time period (e.g., a day or week) for each unique telephone number. If the request is in violation of the new account registration limit (240-Yes), the request is refused 242. Otherwise (240-No), processing of the request continues, for example with operation 206 (FIG. 2A) or operation 234 (FIG. 2B).

Figure 3A:
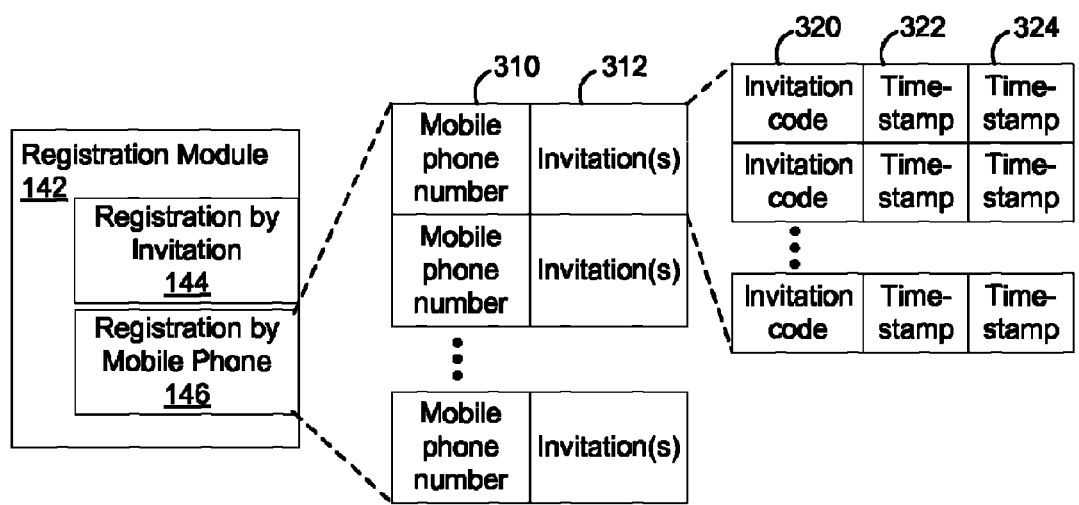
FIG. 3A is a block diagram illustrating a data structure of a registration module according to an embodiment of the present invention.
Figure 3B:
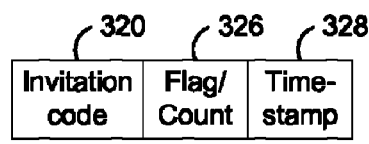
FIG. 3B is a block diagram illustrating a data structure of a registration module according to another embodiment of the present invention.

FIG. 3A is a block diagram illustrating a data structure of a registration module according to one embodiment of the present invention. It is noted that the data structures shown in FIGS. 3A and 3B are exemplary, and that many other data structures known to those skilled in the art could be used in alternate embodiments. The registration module 142 may include a registration by invitation module 144 and registration by mobile telephone module 146. This discussion concerns the registration by mobile telephone module 146. Each time a user submits a request to register a new user account with the same mobile phone number 310, an invitation code 320 is generated and associated with that particular telephone number. Upon generation of the invitation code 320, a first time stamp 322 may also be generated and associated with the telephone number. The first time stamp 322 may be used to impose an expiration time or time limit for the generated invitation code 320. For example, if the user has failed to complete an account registration using the invitation code when the time represented by the time stamp 320 is reached, or by a predefined amount of time (e.g., 1 day) after the time represented by the time stamp, the generated invitation code 320 may expire and the user may have to begin the registration process from the beginning. Optionally, a second time stamp 324 may be stored in association with the invitation code 320 when a user registers a new user account using the invitation code 320. The presence or absence of a non-null or valid second time stamp 324 may therefore be used to distinguish between invitation codes successfully used to register user accounts and invitation codes that have not been successfully used to register user accounts.

As shown in FIG. 3A, each phone number 310 for which at least one invitation code has been generated may have a group of invitations 312 associated with it. Each invitation in the group of invitations is represented by an invitation code 320 and one or more time stamps 322, 324. In some embodiments, the registration by mobile phone module 146 (or other appropriate software module) may expunge an invitation 312 from the stored data when an associated time stamp meets predefined criteria. For example, the criteria may be that the time stamp is more than X days old, where X is a number such as 7 or 28 or the like.

FIG. 3B is a block diagram illustrating an alternate data structure for representing an invitation 312 (see FIG. 3A) according to another embodiment of the present invention. Each time a user submits a request to register a new user account with the same phone number, an invitation code 320 will be generated and associated with that particular telephone number. In this example, a flag or count 326 may generated and associated with the particular mobile telephone number. If the value is a flag 326, the flag may be used to indicate whether the associate invitation code has been successfully used to register a user account. In some embodiments, each invitation code may be used to register N user accounts (e.g., 2 or 3 accounts), and the count 326 is used to keep track of the number of such user accounts that have been registered using the invitation code 320. In the other embodiments described above, each invitation code 320 can be used to register no more than one new user account. The time stamp 328 in the invitation 312 may be used to record the time at which the invitation code 320 was first sent to a user. In some embodiments, when the user successfully uses the invitation code to register a user account, the flag or count 326 is updated to indicate that successful registration. In addition, in some embodiments, the time stamp 328 is rewritten to record the time at which the user account was registered.

Figure 4:
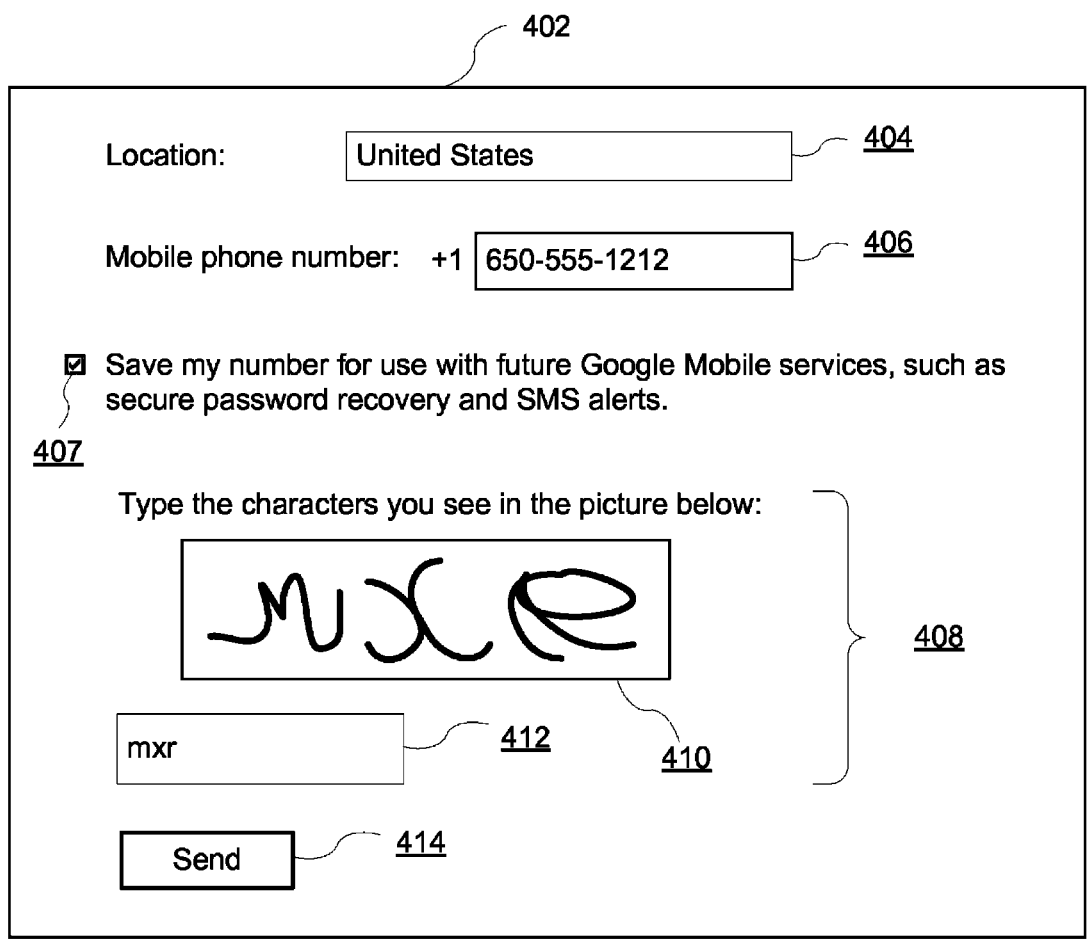
FIG. 4 illustrates a schematic screenshot of a user inputting a mobile telephone number and responding to a challenge as an initial step of registering for a new user account according to an embodiment of the present invention.

FIG. 4 illustrates a schematic screenshot of a user interface 402 for entering a mobile telephone number and responding to a challenge as an initial step of registering for a new user account according to one embodiment of the present invention. In this example, the user selects a country 404 in accordance with where the user is located. The user enters a mobile telephone number into a mobile telephone number field 406 to which an invitation code will be sent. Optionally, the user may select whether the user's mobile telephone number can be used for future Google Mobile services in the future by checking or un-checking a checkbox 407. Such future Google Mobile services may include password recovery, SMS alerts (e.g., e-mail notifications), and so on.

The user interface 402 of FIG. 4 includes a challenge 408 presented to the user in conjunction with this initial step of registering a new user account. In this example, the challenge 408 is a visual CAPTCHA involving identification of distorted text 410. A text box 412 is also included for typing in the response. The user is asked to type in the response into the text box 412 before clicking the send box 414. If the text typed into the text box 412 correctly identifies the text shown in the challenge, then an invitation code will be generated and sent to the mobile telephone number provided in the mobile telephone number field 406. In some embodiments, if the typed text incorrectly identifies the CAPTCHA text, a new challenge will be presented and a new set of distorted text 410 will appear. Alternately, if the typed text incorrectly identifies the CAPTCHA text, the request may be refused.

Figure 5A:
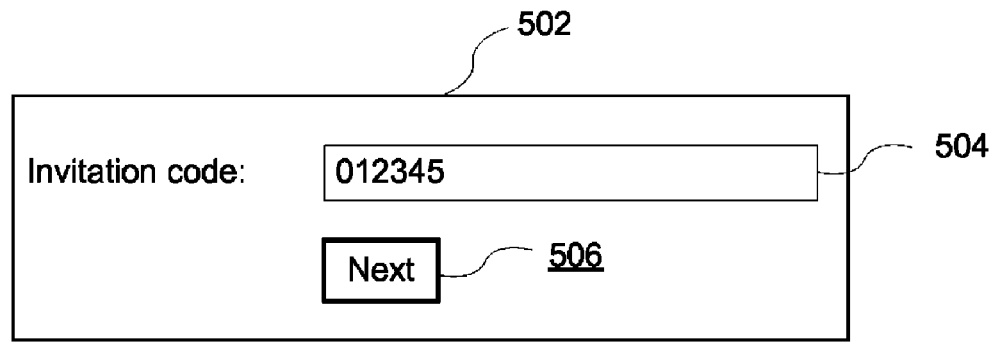
FIG. 5A illustrates a schematic screenshot of a user providing an invitation code as a secondary step of registering for a new user account according to an embodiment of the present invention.

FIG. 5A illustrates a schematic screenshot of a user interface 502 for providing an invitation code as a secondary step of registering a new user account according to one embodiment of the present invention. In this example, the user interface 502 allows a user to input only a received invitation code. This user interface 502 appears after the user has entered a mobile telephone number and successfully completed the challenge as shown in FIG. 4. The invitation code entered into user interface 502 must be associated (in the internal database of the online service) with the mobile telephone number provided in the previous user interface 402; otherwise the invitation code entered in user interface 502 will be rejected by the online service. In other words, the invitation code entered into user interface 502 must be the invitation code the user received via the telephone associated with the telephone number entered in the previous user interface 402. After entering an invitation code in invitation code field 504, the user may then click the "Next" button 506 to proceed to the account registration page 600 as illustrated in FIG. 6.

Figure 5B:
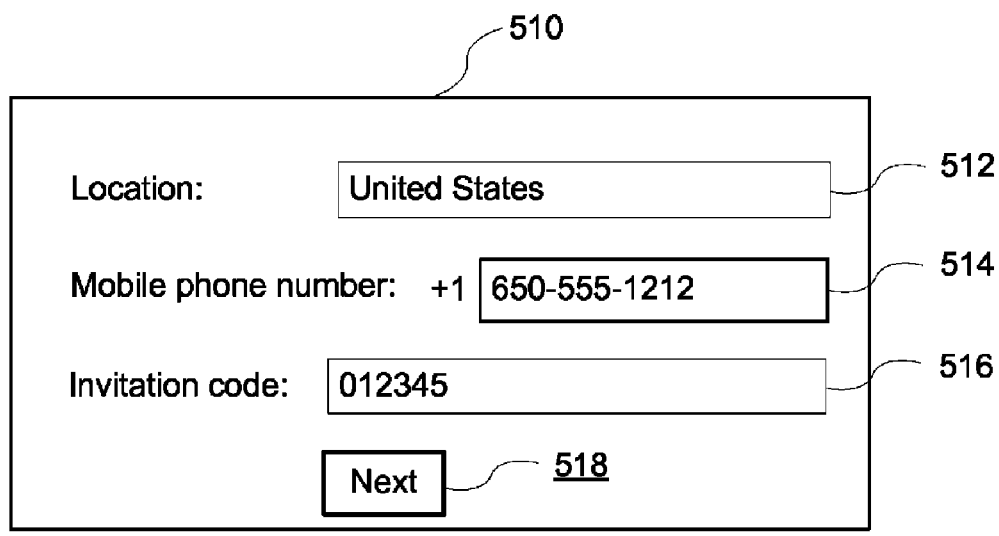
FIG. 5B illustrates a schematic screenshot a user providing an invitation code and mobile telephone number as a secondary step of registering for a new user account according to another embodiment of the present invention.

FIG. 5B illustrates a schematic screenshot of a user interface 510 for providing both an invitation code and a mobile telephone number as a secondary step of registering for a new user account according to another embodiment of the present invention. In this example, user interface 510 requires a user to input both a mobile telephone number and an associated invitation code. The user selects a location in the location field 512 according to where the user is located. The user may then input a mobile telephone number in the mobile telephone number field 514. In the invitation code field 516, the user may input the invitation code that was received on the associated mobile telephone. The user may then click the "Next" button 506 to proceed to the account registration page 600 as illustrated in FIG. 6. In some embodiments, the location and mobile telephone number fields 512, 514 in the user interface 510 may be automatically populated (by the online service) with the values entered using the previous user interface 402 when this form 510 is transmitted to the user's client device. If appropriate, the user may replace the initial values in one or both of these fields 512, 514 when entering the invitation code in field 516.

FIG. 6 illustrates a schematic screenshot of an account registration page or user interface 600 according to one embodiment of the present invention. This account registration page 600 allows a user to provide relevant user information in order to set up a new user register for a new user account, one example of which is a new email account. The user provides a first name 602, a last name 604, and a desired login name 606 for the new user account. The user may confirm whether the desired login name is already in use by clicking the "Check availability" button 608. If the login name is already being used by another user, the user is asked to select another login name. If the login name is available, the user may continue. The user inputs a password 610 and re-enters that password 612 for confirmation. The user may select a security question 614 and provide an answer to that security question 616. The security question 614 and associated answer 616 may be used in the future for password recovery. The user may also provide a secondary email address 618 that has already been created and is active. This secondary email address may be used to send a confirmation of the newly created account and may also be used for password recovery. Optionally, a location field 620 may also be provided, for specifying the country in which the user resides or intends to use the online service. Finally, the user may read the Terms of Service 622 and by clicking the "I accept. Create my account" button 624, the user thereby agrees to those terms outlined in the Terms of Service 622 and consequently creates a new user account. The email registration page or user interface 600 shown in FIG. 6 is exemplary; many other forms or user interfaces may be used to complete the process of registering a new online service account or user account.

Figure 7:
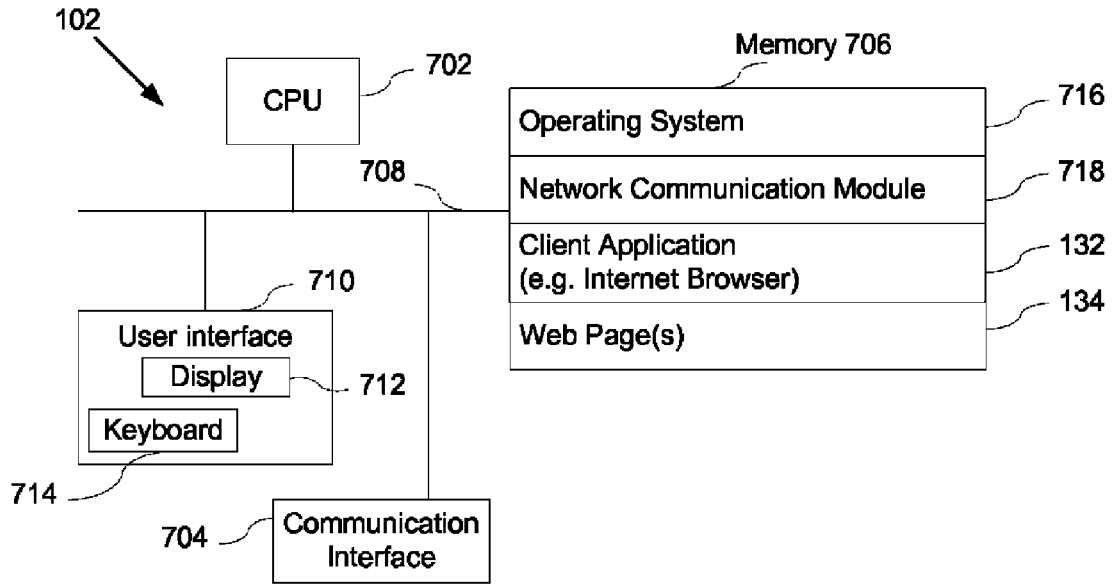
FIG. 7 is a block diagram of an exemplary client computer or device in accordance with some embodiments of the present invention.

FIG. 7 is a block diagram illustrating a client 102 in accordance with an embodiment of the present invention. The client 102 typically includes one or more processing units (CPUs) 702, one or more network or other communications interfaces 704, memory 706, and one or more communication buses 708 for interconnecting these components. The communication buses 708 may include circuitry (sometimes called a chipset) that interconnects and controls communications between system components. The client 102 optionally may include a user interface 710 comprising a display device 712 and a keyboard 714. Memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706 may optionally include one or more storage devices remotely located from the CPU(s) 702. In some embodiments, memory 706 stores the following programs, modules and data structures, or a subset thereof:
- an operating system 716 that includes procedures for handling various basic system services and for performing hardware dependent tasks;
- a network communication module 718 that is used for connecting the client 102 to other computers via the one or more communication network interfaces 704 and one or more communication networks, such as the Internet, other wide area networks, local area networks, metropolitan area networks, and so on;
- a client application 132 that can permit a user to interact with the client 102 as described above; and
- one or more web pages 134 that may be displayed on client application 132.

Figure 8:
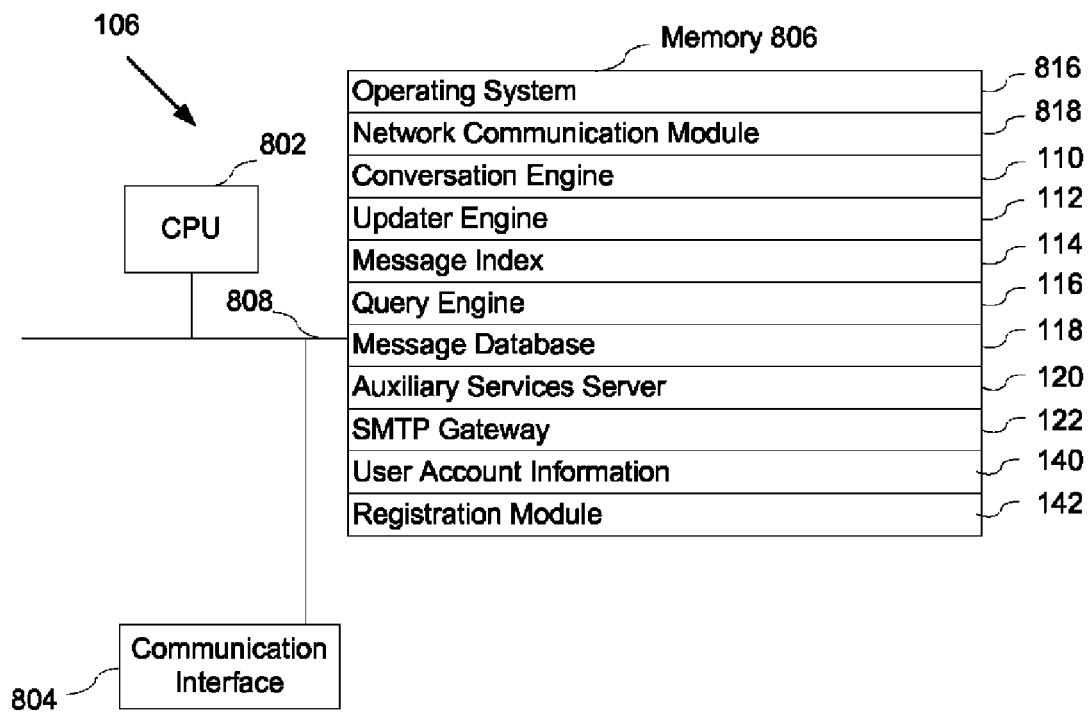
FIG. 8 is a block diagram of an exemplary information server in accordance with some embodiments of the present invention.

FIG. 8 is a block diagram illustrating an information service 106 in accordance with one embodiment of the present invention. The information service 106 typically includes one or more processing units (CPUs) 802, one or more network or other communications interfaces 804, memory 806, and one or more communication buses 808 for interconnecting these components. The communication buses 808 may include circuitry (sometimes called a chipset) that interconnects and controls communications between system components. The information service 106 optionally may include a user interface (not shown). Memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 806 may optionally include one or more storage devices remotely located from the CPU(s) 802. In some embodiments, memory 806 stores the following programs, modules and data structures, or a subset thereof:
- an operating system 816 that includes procedures for handling various basic system services and for performing hardware dependent tasks;
- a network communication module 818 that is used for connecting the information service 106 to other computers via the one or more communication network interfaces 804 and one or more communication networks, such as the Internet, other wide area networks, local area networks, metropolitan area networks, and so on;
- user account information 140 for storing information related to a particular user account; and
- registration module 142 for registering new user accounts.

In some embodiments, the information service 106 includes the following elements, or a subset or superset of such elements: a conversation engine 110 for responding to a variety of requests from the client assistant 134 returning conversation-based responses; an updater engine 112 for updating a message database 118; a message index 114 containing index information for messages in the message database 118; a query engine 116 for performing various queries using the message index 114 and message database 118; a message draft processor for generating a draft update using a new and an old message drafts; an auxiliary services server 120 for performing various auxiliary services; and an SMTP gateway 122 for sending and receiving messages.

Each of the above identified elements in FIGS. 7 and 8 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 706 or 806 may store a subset of the modules and data structures identified above. Furthermore, memory 706 or 806 may store additional modules and data structures not described above.

Although FIGS. 7 and 8 show respectively a client 102 and an information service 106, the figures are intended more as functional descriptions of the various features which may be present in a client and set of servers than as a structural schematic of the embodiments described herein. In practice, and as recognized by those of ordinary skill in the art, items shown separately could be combined and some items could be separated. For example, some items shown separately in FIG. 8 could be implemented on single servers and single items could be implemented by one or more servers. The actual number of servers used to implement an information service 106 and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer implemented method for registering user accounts with an online service, comprising:
   at an online service having one or more processors and memory storing one or more programs to be executed by the one or more processors:
      receiving a request for an invitation code from a client wherein the request includes a mobile telephone number;
      generating an invitation code;
      storing information corresponding to the invitation code and the received telephone number in association with each other, wherein the storing includes storing the invitation code, the mobile telephone number and a timestamp together in a data structure; and
      sending the generated invitation code to the mobile telephone number, wherein the invitation code is sent in a text message sent to a mobile telephone associated with the mobile telephone number.

2. The computer implemented method of claim 1, including storing a value in association with the mobile telephone number and invitation code, wherein the value indicates whether an account was registered using the mobile telephone number and invitation code.

3. The computer implemented method of claim 1, including storing a count value in association with the mobile telephone and invitation code, wherein the count value corresponds to a number of accounts registered using the mobile telephone number.

4. The computer implemented method of claim 1, including
   accepting a registration request that includes the invitation code and the associated mobile telephone number.

5. The computer implemented method of claim 1, including
   receiving a registration request that includes a proffered invitation code; and
   accepting the registration request only if the proffered invitation code is consistent with the stored information.

6. The computer implemented method of claim 1, including
   receiving a registration request that includes a proffered invitation code and telephone number; and accepting the registration request only if the proffered invitation code and telephone number are consistent with the stored information.

7. A computer implemented method for registering user accounts with an online service, comprising:
   at an online service having one or more processors and memory storing one or more programs to be executed by the one or more processors:
   presenting to a client a challenge;
   receiving a request for an invitation code from the client wherein the request includes a telephone number and a response to the presented challenge;
   upon determining satisfactory completion of the presented challenge, performing the following operations:
      generating an invitation code;
      storing information corresponding to the invitation code and the received telephone number in association with each other; and
      sending the generated invitation code to the telephone number.

8. The computer implemented method of claim 7, wherein the challenge comprises a completely automated public Turing test to tell computers and humans apart (CAPTCHA).

9. A system for registering user accounts with an online service, comprising:
   memory;
   one or more processors; and
   one or more modules stored in memory and configured for execution by the one or more processors, the modules comprising:
      instructions for receiving a request for an invitation code from a client wherein the request includes a mobile telephone number;
      instructions for generating an invitation code;
      instructions for storing information corresponding to the invitation code and the mobile telephone number in association with each other, wherein the instructions for storing include instructions for storing the invitation code, the mobile telephone number and a timestamp together in a data structure; and
      instructions for sending the generated invitation code to the mobile telephone number.

10. The system of claim 9, including
    instructions for storing a value in association with the mobile telephone number and invitation code, wherein the value indicates whether an account was registered using the mobile telephone number and invitation code.

11. The system of claim 9, including
    instructions for storing a count value in association with the mobile telephone and invitation code, wherein the count value corresponds to a number of accounts registered using the mobile telephone number.

12. The system of claim 9, including
    instructions for accepting a registration request that includes the invitation code and the associated mobile telephone number.

13. The system of claim 9, including
    instructions for receiving a registration request that includes a proffered invitation code; and
    instructions for accepting the registration request only if the proffered invitation code is consistent with the stored information.

14. A system for registering electronic mail accounts, comprising:

memory;

one or more processors; and one or more modules stored in memory and configured for execution by the one or more processors, the modules comprising:

instructions for presenting to a client a challenge;

instructions for receiving a request for an invitation code from the client wherein the request includes a mobile telephone number and a response to the presented challenge;

instructions for determining satisfactory completion of the presented challenge;

instructions for generating an invitation code;

instructions for storing information corresponding to the invitation code and the mobile telephone number in association with each other; and instructions for sending the generated invitation code to the mobile telephone number.

15. The system of claim 14, wherein the challenge comprises a completely automated public Turing test to tell computers and humans apart (CAPTCHA).

* * * * *